United States Patent [19]

Sato et al.

[11] 4,345,114
[45] Aug. 17, 1982

[54] METHOD AND APPARATUS FOR RECORDING AND REPRODUCING A MESSAGE WITH AN INDICATION OF A TIME OCCURRENCE

[75] Inventors: Takashi Sato; Tomio Tsuchiya; Yasuo Matushima, all of Tokorozawa, Japan

[73] Assignee: Pioneer Ansafone Manufacturing Corporation, Saitama, Japan

[21] Appl. No.: 144,096

[22] Filed: Apr. 28, 1980

[30] Foreign Application Priority Data

Apr. 27, 1979 [JP] Japan .................................. 54-51409

[51] Int. Cl.³ ............................................. H04M 1/65
[52] U.S. Cl. .................................... 179/6.16; 360/137
[58] Field of Search ................... 360/72.3, 5, 71, 72.1, 360/137; 179/6.01, 6.03, 6.13, 6.16, 6.17; 369/30, 32, 27

[56] References Cited

U.S. PATENT DOCUMENTS

| | | | |
|---|---|---|---|
| 3,728,486 | 4/1973 | Kraus | 179/6.17 |
| 3,808,372 | 4/1974 | Sielsch | 179/6.01 |
| 3,921,220 | 11/1975 | Primosch et al. | 360/72.3 |
| 3,925,617 | 12/1975 | Sato | 179/6.13 |
| 4,012,784 | 3/1977 | Murphy et al. | 360/5 |

FOREIGN PATENT DOCUMENTS

| | | | |
|---|---|---|---|
| 972885 | 8/1975 | Canada | 179/6.03 |
| 2254023 | 5/1973 | Fed. Rep. of Germany | 179/6.03 |

*Primary Examiner*—Bernard Konick
*Assistant Examiner*—Donald McElheny, Jr.
*Attorney, Agent, or Firm*—Sughrue, Mion, Zinn, Macpeak & Seas

[57] ABSTRACT

A message received through a telephone line is recorded by a tape recorder associated therewith in which a time instance at which the recording is started is memorized together with a specific count of pulses produced in synchronism with a transportation of the tape. When the message is to be reproduced, the specific count is compared with a current count and when the two coincide with each other the memorized time instance is indicated.

3 Claims, 3 Drawing Figures

METHOD AND APPARATUS FOR RECORDING AND REPRODUCING A MESSAGE WITH AN INDICATION OF A TIME OCCURRENCE

BACKGROUND OF THE INVENTION

The present invention relates to a tape recorder such as a telephone answering and recording device and, particularly, to a method of recording a time instance at which a message is transmitted through a telephone line and indicating the latter when the message is reproduced later.

In such a tape recorder which responds to a telephone call signal to transmit prerecorded announcement and record a message transmitted by a caller when a subscriber is absent, it is convenient for the subscriber to know the time instance at which the message is received. In order to realize this, it has been proposed to record the time instance by using an audible watch whose time signal is recorded simultaneously on the magnetic tape with the message. It is possible to use a portion of a broadcasting program instead of the audible watch. Another method proposed is to record, together with the message, a time signal provided by an automatic dialing system.

The method of using the audible watch or the automatic dialing system requires a complicated hardware and thus the cost therefor is very high, causing the realization thereof to be difficult. In the method of using the broadcasting program the subscriber must be highly trained, otherwise this method becomes unusable. Furthermore, in this method it is very difficult to determine the exact time instance.

SUMMARY OF THE INVENTION

An object of the present invention is to provide a method of recording and indicating a time instance at which a message is received and a recording of the message is started, and which has none of the disadvantages inherent to the conventionally proposed methods.

The above object is achieved, according to the present invention, by making respective positions of a message tape of a tape recorder in correspondence with the time instances by using output pulses of a pulse generator operable in synchronism with movements of the tape, counting the output pulses and memorizing the counts and time instances at which recordings of messages are started, respectively, and reading out and displaying the time instances corresponding to the counts during an operation of the tape recorder in reproduction mode.

DETAILED DESCRIPTION OF THE EMBODIMENT

Figure 1:
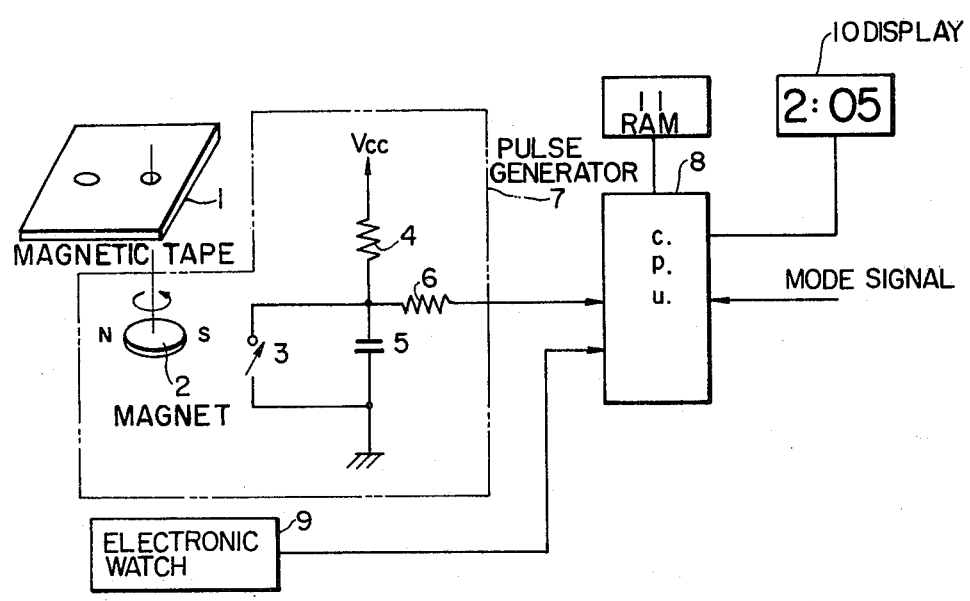
FIG. 1 is a schematic block diagram suitable to perform the method according to the present invention.

FIG. 1 shows a schematic circuit diagram of the present invention. In FIG. 1, the circuit comprises a pulse generator 7 which is constituted with a magnet 2 fixedly secured to a take-up reel shaft or supply reel shaft of a tape recorder including a magnetic tape 1 for recording and reproducing messages, a reed switch 3 controlled by the magnet 2, resistors 4 and a capacitor 5. When the message tape 1 is transported, the magnet 2 repeatedly actuates the reed switch 3 to cause it to be in a on-off state so that the pulse generator 7 produces pulses whose count number corresponds to a specific position along the message tape 1.

In a recording mode which is set upon a mode signal supplied to a microprocessor 8 (referred to as CPU hereinafter) of a microcomputer system, the output pulses of the pulse generator 7 are fed to an input of the CPU 8 and counted up therein.

On the other hand, a time signal supplied from a electronic clock 9 is fed in binary form to the CPU 8. When a recording of one message on the message tape 1 commences, the output of the electronic clock 9 is memorized together with the count up to the first pulse of the pulses from the pulse generator 7 in a memory device 11 such as RAM which is equiped in the CPU 8. The output pulses of the pulse generator 7 are counted up in the CPU 8 continuously during the forward transportation of the tape for recording.

For example, assuming that the count of the output pulses of the pulse generator 7 at a time when the recording of the Nth message commences is 356 and the time instance is 13:45, the memory device 11 memorizes, in binary form, the time instance 13:45 in correspondence with the pulse count of 356. Since the output pulses of the pulse generator 7 is counted until the recording of the message terminates, the content of the counter will increase with the recording up to, for example, 415 at which the transportation of the message tape 1 is stopped by the termination of the recording and maintained stopped until a recording of the (N+1) th message commences. Further assuming that, when the (N+1) th message is supplied and the recording thereof is started, the count of the output pulses of the pulse generator is 416 and the time is 14:05, the time instance 14:05 is memorized together with the count 416.

Figure 2:
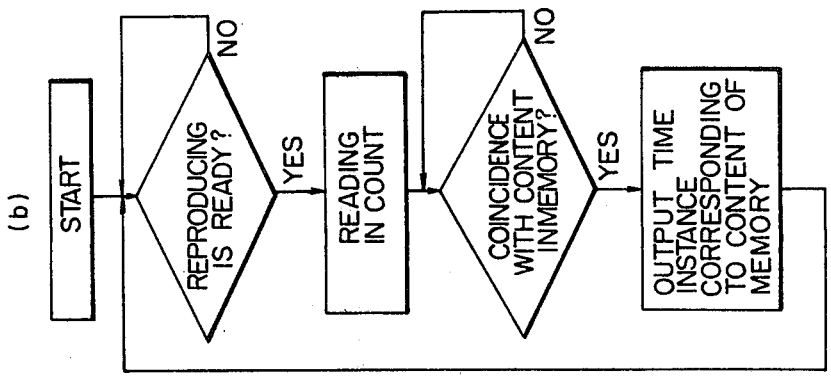
FIG. 2a is a flow chart describing the recording mode operation of the present invention.
FIG. 2b is a flow chart describing the reproducing mode operation of the present invention.
Figure 2:
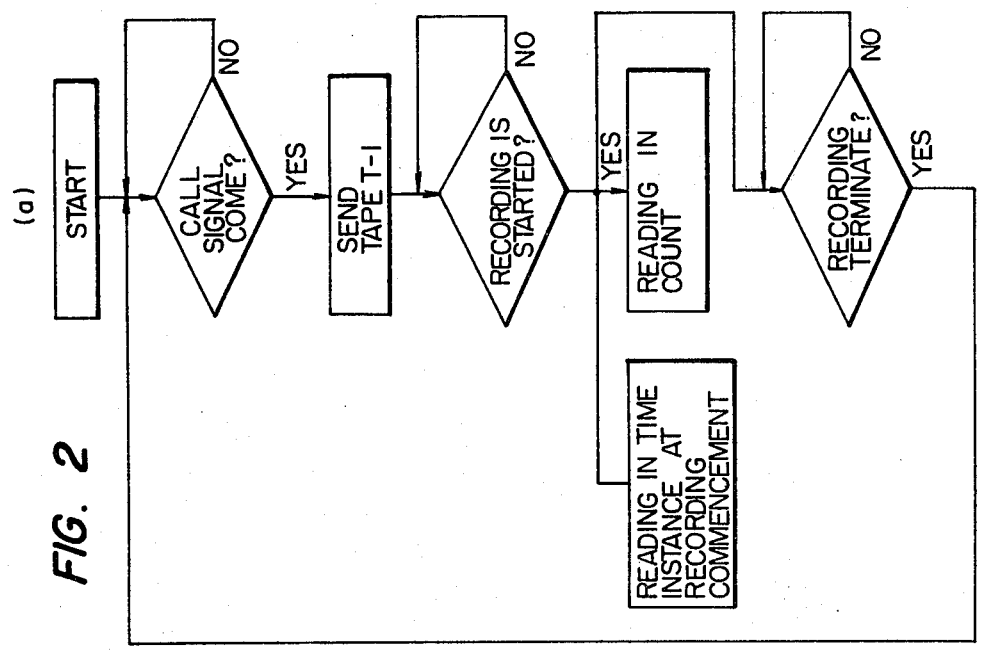

In this manner, the time at which the recording of each of the messages commences is memorized by the memory 11. FIG. 2a is a flow-chart of the above operation of the present apparatus when applied to the automatic telephone answering and message recording system.

In FIG. 2a upon a reception of a call signal, a previously recorded response on a response tape T−1 is reproduced and subsequent thereto the recording of a message is started. Simultaneously a counting of the output pulses of the pulse generator 7 is started, with the starting time instance of the recording being memorized together with the pulse count at that time. Thus, the message recorded on the tape is given the starting time of the message.

During the reproducing operation which is shown by a flow chart in FIG. 2b, the tape 1 is rewound so that the region of the tape on which the message has been recorded reaches a suitable reproducing position in a tape recorder which may be slightly ahead of the message starting position. During the rewinding operation, the pulse count at the starting time of the rewinding is counted down by the output pulses of the pulse generator 7.

When rewinding operation is completed and the winding operation of the tape is started for reproduction, the count corresponding to the position of the tape is memorized and compared with the count at the starting time of the recording. Since, during the operation of the tape recorder in the reproduction mode, the counting up of the output pulses of the pulse generator 7 is performed, the count increases again from the count corresponding to the actual position of the tape with the winding operation. When the count coincides with the memorized count, the time memorized corresponding to the memorized count is indicated on the display 10.

Describing the above in more detail with reference to the previously mentioned example, with a further assumption that the tape is rewound until the count reduces to 350 and the tape recorder is switched into the reproduction mode, the tape is started to move forwardly and the count will increase from 350 with the movement of the tape. When the count coincides with the memorized count, i.e., 356, the reproduction of the Nth message is started and simultaneously the time 13:45 which has been also memorized correspondingly to the count 356 is indicated on the display 10. During the operation of the recorder in the reproduction mode, the count of the output pulses of the pulse generator 7 will increase and when it reaches 416, the time 14:05 memorized correspondingly to the count 416 is indicated on the display 10, and the reproduction of the (N+1)th message is started.

As described hereinbefore, according to the present invention, the pulse generator produces pulses in response to a movement of the tape so that the count is always related to specific position on the tape, which are counted and memorized together with the time instance information in binary form which is supplied by the electronic clock.

What is claimed is:

1. A method of automatically recording and reproducing telephone messages on a tape, comprising the steps of:

recording a received message on a tape; producing pulses in synchronism with the advance of said tape in both the forward and reverse directions; counting up and down said pulses with the forward and reverse directions, respectively, of said tape advance to maintain a pulse count indicative of the tape position; storing in a memory, at the time of recording of a message, said pulse count corresponding to the tape position of said message along with an actual time indication obtained from an electronic clock; comparing during playback mode said pulse count representing the current position of said tape with said memorized pulse counts; and displaying during said playback mode said memorized time indication which was memorized along with a pulse count that compares equally with the current pulse count, whereby the time of recording of a message is indicated when said message is played back.

2. An apparatus for automatically recording and reproducing a message received through a telephone line on a tape recorder and indicating the time instance at which the message is received and a recording thereof is started by said tape recorder; said tape recorder having a tape reel shaft rotating with a translation of the tape of said tape recorder; said apparatus comprising:

means operatively coupled to said tape reel shaft for generating pulses with said translation of the tape during the recording and reproducing of said messages;

counting means connected to said pulse generating means for counting the pulses generated; said count being counted up in one rotational direction of said tape reel shaft and being counted down in the opposite rotational direction of said tape reel shaft;

clock means for providing actual time instance;

memory means connected to said counting means and said clock means for memorizing the pulse count provided by said counting means at the time the recording of a message is started and for memorizing the actual time instance at that time provided by said clock means;

comparator means connected to said memory means and said counting means for comparing during reproducing of said message the pulse count with said memorized count and for providing as an output the corresponding memorized time instance when a coincidence is found; and display means for receiving said output from said comparator means and for displaying the time instance during said reproducing of said message.

3. The apparatus of claim 2 wherein said memory means and said comparator means comprise a central processing unit.

* * * * *